UNITED STATES PATENT OFFICE.

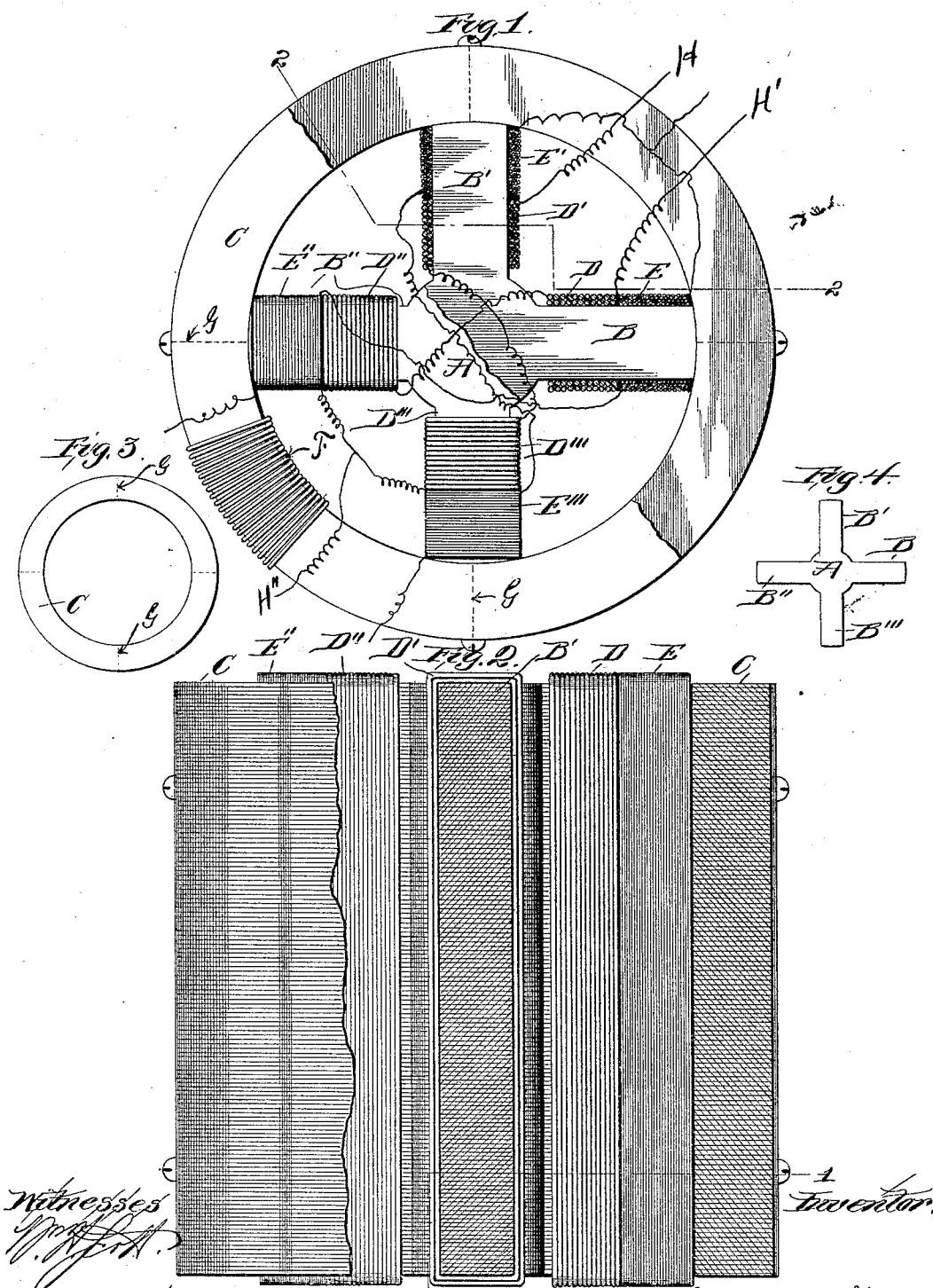

HERMANN O. C. EDMUND WAGEMANN, OF ST. LOUIS, MISSOURI, ASSIGNOR OF THREE-FOURTHS TO CHARLES F. ORTHWEIN, OF SAME PLACE.

MULTIPHASE CONVERTER.

SPECIFICATION forming part of Letters Patent No. 526,063, dated September 18, 1894.

Application filed July 5, 1892. Serial No. 439,041. (No model.)

*To all whom it may concern:*

Be it known that I, HERMANN OTTO CHARLES EDMUND WAGEMANN, a citizen of the United States, residing in the city of St. Louis, State of Missouri, have invented certain new and useful Improvements in Multiphase Converters, of which the following is a full, clear, and exact description.

My invention relates to the principles of construction of converters for transforming multi-phase currents from either a lower to a higher, or a higher to a lower tension, and has for its object a form of construction adapted to accommodate the proper proportions of iron and copper, in the converter, as a whole, for the distribution of electric currents of the multi-phase character to sections of long distance electric railroads; one in which the primaries and secondaries can be properly and conveniently insulated from each other in the use of high tension currents; one in which the distribution of the windings can be so disposed about the iron of the same as to allow for thorough ventilation; one in which the windings can be differently disposed, in order to take the greatest advantage of the induced magnetic field; one in which the winding of the coils is conveniently effected; one which is simple and inexpensive to make; and one in which the several windings of the primaries and secondaries are connected together in such a manner as to adapt the converter to be used in connection with a multi-phase generator, the subject-matter of an application to be filed, herewith, Serial No. 439,043, in which a system of internal connections of the windings of the armature is described and claimed adapting the energy of the multi-phase currents generated thereby to be transmitted to a converter, of the character herein described, over a number of conductors less than the number of phases.

It consists in the features of improvement in converters hereinafter described, reference being had to the accompanying drawings.

Figure 1 is a plan view of one end of my new converter, partly in section, taken as on the line 1—1 in Fig. 2. Fig. 2 is a side elevation of the same, partly in section, taken as on the line 2—2 in Fig. 1. Figs. 3 and 4 are, respectively, outline views of the laminations of the two parts of which the iron portion of my converter is composed.

Like letters of reference denote like parts in the several figures.

As illustrated in Figs. 1 and 2, the iron of the converter, as a whole, is composed of, preferably, two parts, the central part, the form of the laminations of which are illustrated in Fig. 4, which are formed with a central hub A and the radial arms B, B', &c., and the cylindrical inclosing piece C, the form of the annular laminations of which are shown in Fig. 3. The inner diametrical dimensions of the ring-shaped piece C is such as to closely fit on the turned-off ends of the radial arms B, B', &c. The number of radial arms, in any instance, corresponds to the number of phases of the current used with the same. As shown, there are four arms, on each of which is wound, respectively, the primaries D, D', &c., of the different phases and the secondaries E, E', &c., side by side. It is evident, from the construction of the iron part, as described, that the primary and secondary windings might be placed one on the top of the other on the arms B, B', &c., or that the windings of either the secondaries E, E', &c., or the primaries D, D', &c., or both the primaries and secondaries might be extended and part be wound on the cylinder portion of the iron, as shown at F, in Fig. 1. If it were found advisable to wind the outer ring-shaped member, it might be of advantage, to facilitate the work of winding, to subdivide the ring-shaped laminations of the outer part into the four quadrants, as shown by the dotted lines G in Figs. 3 and 1, and then, when wound, secure these parts together in the manner shown in Figs. 1 and 2, as a whole. As shown in Fig. 1, the windings D, D', &c., of the primaries [the secondaries, if it were a step-down converter] correspond, in number, to the phases of the current generated at the generator, corresponding in consecutive order to the first, second, third, &c., phases of the current. As shown, the converter is of the four-phase type, corresponding to the type of generator described in the aforementioned application, the principles of the system of internal connections between the different coils being, however, the same for six or eight phases, when the number of independent coils, and, consequently, the possible number of magnetic axes in the converter, would be correspondingly increased.

As already specified in the aforementioned application, for a four-phase current there are used three conductors. In making provision, in the converter, to utilize the current energies transmitted thereby, I connect up the terminals of the primary windings in the following manner, as illustrated in Fig. 1: Presuming that the different windings D, D', &c., in the converter, correspond, respectively, to the first, second, &c., phase-windings of the generator, they are necessarily placed on consecutive arms B, B', &c., of the converter, in order to successively move the magnetic axis of the same in a rotative direction. I connect the inner terminals of the coils D and D'' and those of the coils D' and D''' internally together, respectively; that is, the inner terminals of the coils situated diametrically opposite each other, connected together in series; and outer terminals of any two consecutive coils connected together, externally, in multiple, those of D'' and D''', as shown in Fig. 1, thus providing for three external terminals of the primaries; as II, H' and H'', Fig. 1. When these primaries are wound on the four quadrants of the cylindrically-shaped outer part C, as at F, Fig. 1, the only resultant change would be that the relative position of the induced magnetic poles would be modified.

The inner terminals of the oppositely situated secondary coils, as E and E'', and E' and E''', are similarly connected, respectively, together in series, and the outer terminals of two consecutive coils connected together in multiple, preferably those of E and E', in the drawings which are diametrically opposite the coils, in the primaries similarly connected, in order that the resultant maximum of current energy in the secondaries will be, at all times, correspondingly situated in relation to that in the primaries, in the operation of the converter, when adapted to the three-lead system.

It will be evident, to those acquainted with the principles of the magnetic rotative effect of multi-phase currents, that the form of converter, as shown, might, without any modification, be used for the transformation of eight-phase currents, by winding one-half of the coils, primary and secondary, on the radial extensions B, B', &c., of the central portion, and the other half on the inter-extension space of the encircling external portion C; and, for a six-phase current, form the central portion of the iron body, with three radial extensions and then wind one-half of the coils on the radial extensions and one-half on the ring.

I claim—

1. A converter for the transformation of multi-phase electric currents, the iron body of which is composed of two parts, a central core part formed with radially arranged extensions and a separable annular encircling piece, fitted to said radial extensions, substantially as and for the purposes specified.

2. A converter for the transformation of multi-phase electric currents, the iron body of which is composed of two parts, a central core part formed with radially arranged extensions and a separable annular encircling piece fitted to said radial extensions, said encircling piece being formed in a series of segments, substantially as and for the purposes specified.

3. A converter for the transformation of multi-phase electric currents, the iron body of which is composed of two parts, a central core part formed with radially arranged extensions and a separable annular encircling piece fitted to said radial extensions, said encircling piece being formed in a series of segments fitted together at points corresponding to the points of contact of said radial extensions with the encircling piece, substantially as and for the purposes specified.

4. In a converter for the transformation of four-phase currents, four primary and four secondary coils, the inner terminals of two opposite coils, either of the primary or secondary series being connected together in series and the outer terminals of two consecutive coils being connected together in multiple, substantially as set forth.

In testimony whereof I have affixed my signature, in presence of two witnesses, this 20th day of June, 1892.

H. O. C. EDMUND WAGEMANN.

Witnesses:
A. RAINES,
H. K. WAGNER.